US010402200B2

United States Patent
Dundas et al.

(10) Patent No.: US 10,402,200 B2
(45) Date of Patent: Sep. 3, 2019

(54) HIGH PERFORMANCE ZERO BUBBLE CONDITIONAL BRANCH PREDICTION USING MICRO BRANCH TARGET BUFFER

(71) Applicants: James David Dundas, Austin, TX (US); Gerald David Zuraski, Jr., Austin, TX (US); Timothy Russell Snyder, Austin, TX (US)

(72) Inventors: James David Dundas, Austin, TX (US); Gerald David Zuraski, Jr., Austin, TX (US); Timothy Russell Snyder, Austin, TX (US)

(73) Assignee: SAMSUNG ELECTRONICS CO., LTD. (KR)

( * ) Notice: Subject to any disclaimer, the term of this patent is extended or adjusted under 35 U.S.C. 154(b) by 446 days.

(21) Appl. No.: 15/047,617

(22) Filed: Feb. 18, 2016

(65) Prior Publication Data

US 2017/0068539 A1 Mar. 9, 2017

Related U.S. Application Data

(60) Provisional application No. 62/216,352, filed on Sep. 9, 2015, provisional application No. 62/185,530, filed on Jun. 26, 2015, provisional application No. 62/185,535, filed on Jun. 26, 2015.

(51) Int. Cl.
*G06F 9/38* (2018.01)

(52) U.S. Cl.
CPC .................. *G06F 9/3806* (2013.01)

(58) Field of Classification Search
CPC ... G06F 9/3806; G06F 9/3004; G06F 9/30058
See application file for complete search history.

(56) References Cited

U.S. PATENT DOCUMENTS

| 6,438,682 B1* | 8/2002 | Morris ..................... G06F 9/325 |
| | | 712/241 |
| 6,453,411 B1 | 9/2002 | Hsu et al. |
| 2006/0036837 A1 | 2/2006 | Stark et al. |
| 2007/0239975 A1 | 10/2007 | Wang |
| 2008/0209190 A1* | 8/2008 | Bhargava .............. G06F 9/3844 |
| | | 712/240 |
| 2009/0222645 A1* | 9/2009 | Moyer ................ G06F 9/30058 |
| | | 712/205 |
| 2010/0287358 A1* | 11/2010 | Emma ................ G06F 9/30047 |
| | | 712/208 |

(Continued)

*Primary Examiner* — Aimee Li
*Assistant Examiner* — Kasim Alli
(74) *Attorney, Agent, or Firm* — Renaissance IP Law Group LLP

(57) ABSTRACT

Embodiments include a micro BTB, which can predict up to two branches per cycle, every cycle, with zero bubble insertion on either a taken or not taken prediction, thereby significantly improving performance and reducing power consumption of a microprocessor. A front end of a microprocessor can include a main front end logic section having a main BTB, a micro BTB to produce prediction information, and a decoupling queue. The micro BTB can include a graph having multiple entries, and a CAM having multiple items. Each of the entries of the graph can include a link pointer to a next branch in a taken direction, and a link pointer to a next branch in a not-taken direction. The micro BTB can insert a hot branch into the graph as a new seed.

18 Claims, 10 Drawing Sheets

(56) References Cited

U.S. PATENT DOCUMENTS

2013/0332713 A1* 12/2013 Bonanno ............... G06F 9/3806
 712/239
2014/0229719 A1 8/2014 Smeets et al.
2015/0121050 A1* 4/2015 Williams ............ G06F 9/30058
 712/238

* cited by examiner

500

SEQUENTIAL OR MICRO BTB PREDICTION
505

MAIN BTB PREDICTION
510

HIGH PERFORMANCE ZERO BUBBLE CONDITIONAL BRANCH PREDICTION USING MICRO BRANCH TARGET BUFFER

RELATED APPLICATION DATA

This application claims the benefit of U.S. Patent Application Ser. No. 62/216,352, filed Sep. 9, 2015, which is hereby incorporated by reference.

FIELD

The present disclosure generally relates to digital circuits, and more particularly, to branch prediction using a micro branch target buffer (uBTB).

BACKGROUND

Central processing units (CPUs) normally predict the direction and target of branch instructions early in a processing pipeline in order to boost performance. Information about the type, location, and target of a branch instruction is typically cached in a branch target buffer (BTB), which is accessed using an instruction fetch address, and uses a content addressable memory (CAM) to detect if the BTB contains a branch that maps to the current fetch window. A BTB can also use a set associative structure to detect whether the BTB contains a branch that maps to the current fetch window. A conventional BTB is typically a large structure, and when combined with a branch direction predictor, results in at least a one cycle penalty (i.e., bubble) for a predicted-taken branch. In some cases, the conventional BTB may even incur a penalty for a predicted not-taken branch.

Some attempts have been made to address the penalty by using a loop buffer or similar structure to hide the predicted-taken branch bubble, but these approaches have limitations. Loop buffers require that all of the instructions in the loop fit within the loop buffer, not just the branch instructions. Smaller and simpler BTBs that do not incorporate a conditional branch predictor cannot accurately predict branches with dynamic outcomes and will result in wasted performance and energy. Furthermore, smaller and simpler BTBs that do not employ links will waste energy on CAM operations.

SUMMARY

Embodiments can include a front end of a microprocessor having a main front end logic section, which includes a main branch target buffer (BTB). The front end can include a micro BTB separate from the main BTB of the main front end logic section, and configured to produce prediction information. The front end can include a decoupling queue coupled to the micro BTB and to the main front end logic section, and configured to receive and queue the prediction information, and to provide the queued prediction information to the main front end logic section. The micro BTB can include a graph including one or more entries, and a content addressable memory (CAM) including one or more items. The main front end logic section is configured to fetch a program. Each of the one or more entries of the graph of the micro BTB represents a corresponding branch inside an inner portion of the program. Each of the one or more entries of the graph of the micro BTB can include a first link pointer to a first next branch in a taken direction, and a second link pointer to a second next branch in a not-taken direction.

Some embodiments include a computer-implemented method for performing zero bubble conditional branch prediction for a main front end logic section of a microprocessor using a micro branch target buffer (BTB). The method can include producing, by the micro BTB, prediction information that is separate from prediction information produced by a main BTB of the main front end logic section of the microprocessor. The method can include receiving, by a decoupling queue, the prediction information from the micro BTB. The method can include queuing, by the decoupling queue, the prediction information from the micro BTB. The method can include providing, by the decoupling queue, the queued prediction information to the main front end logic section of the microprocessor.

BRIEF DESCRIPTION OF THE DRAWINGS

The foregoing and additional features and advantages of the present inventive principles will become more readily apparent from the following detailed description, made with reference to the accompanying figures, in which.

DETAILED DESCRIPTION

Reference will now be made in detail to various embodiments, examples of which are illustrated in the accompanying drawings. In the following detailed description, numerous specific details are set forth to enable a thorough understanding of the apparatus and method. It should be understood, however, that persons having ordinary skill in the art may practice the embodiments without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first logic circuit could be termed a second logic circuit, and, similarly, a second logic circuit could be termed a first logic circuit, without departing from the scope of the various embodiments.

The terminology used in the description herein is for the purpose of describing particular embodiments only and is not intended to be limiting. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Some embodiments include a micro BTB, which can predict up to two branches per cycle, every cycle, with zero bubble insertion on either a taken or not taken prediction, thereby significantly improving performance and reducing power consumption of a microprocessor.

Figure 1:
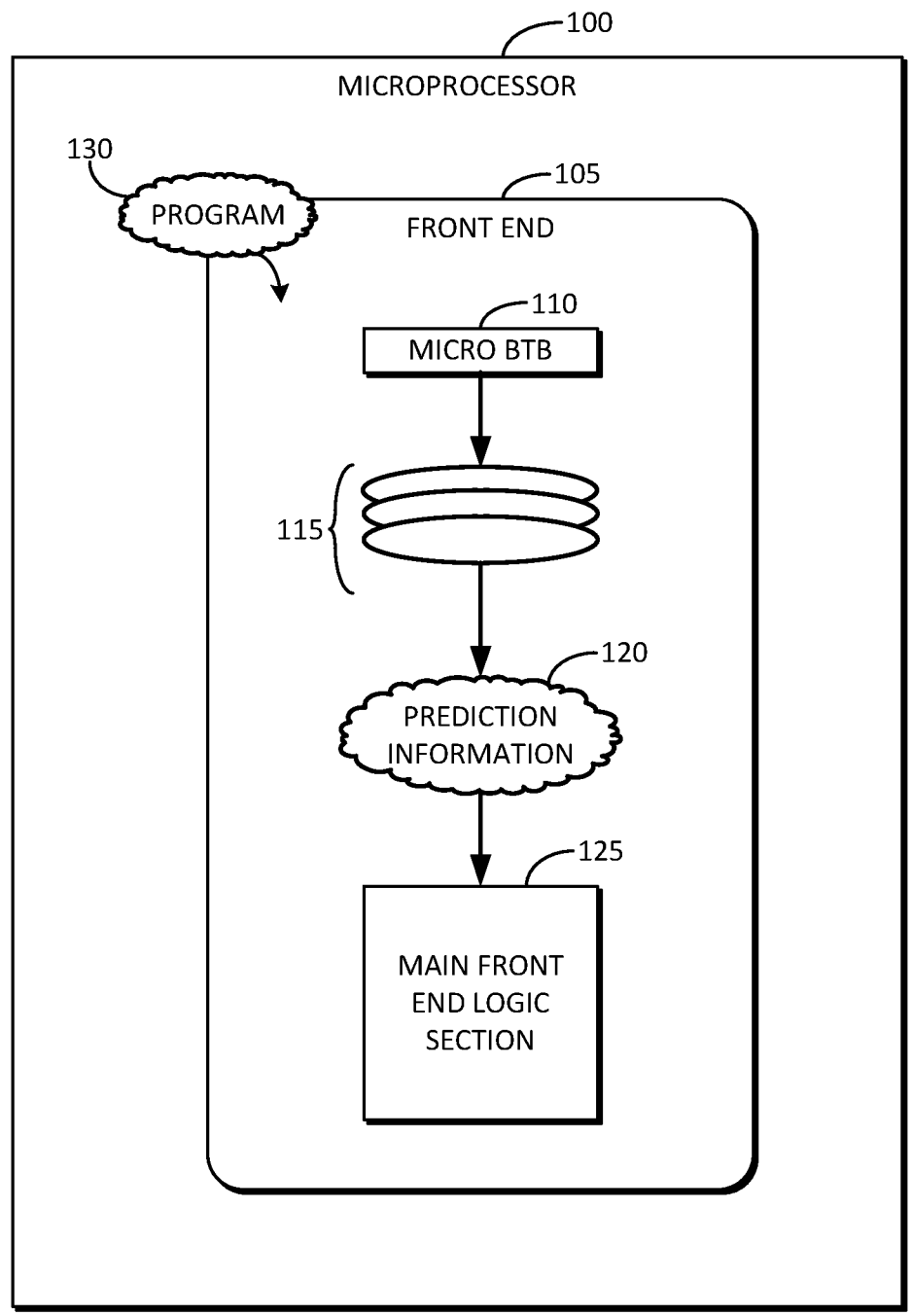
FIG. 1 is an example block diagram of a microprocessor including a front end having a micro BTB and a decoupling queue in accordance with some embodiments.

FIG. 1 is an example block diagram of a microprocessor 100 including a front end 105 having a micro BTB 110 and an associated decoupling queue 115 in accordance with some embodiments. The front end 105 can include instruction cache, branch prediction logic, fetch logic, or the like, as further described below. The micro BTB 110 and the decoupling queue 115 can produce prediction information 120, which can be received by a main front end logic section 125 of the microprocessor 100, as also further described below. The decoupling queue 115 can feed the prediction information 120 to the main front end logic section 125 and decouple the micro BTB 110 from the rest of the microprocessor 100. The microprocessor 100 can execute a program 130, which is also described in detail below. When the micro BTB 110 is confident in the prediction information 120, the micro BTB 110 can power gate main prediction structures of the main front end logic section 125, thereby significantly reducing power consumption of the microprocessor 100.

Figure 2:
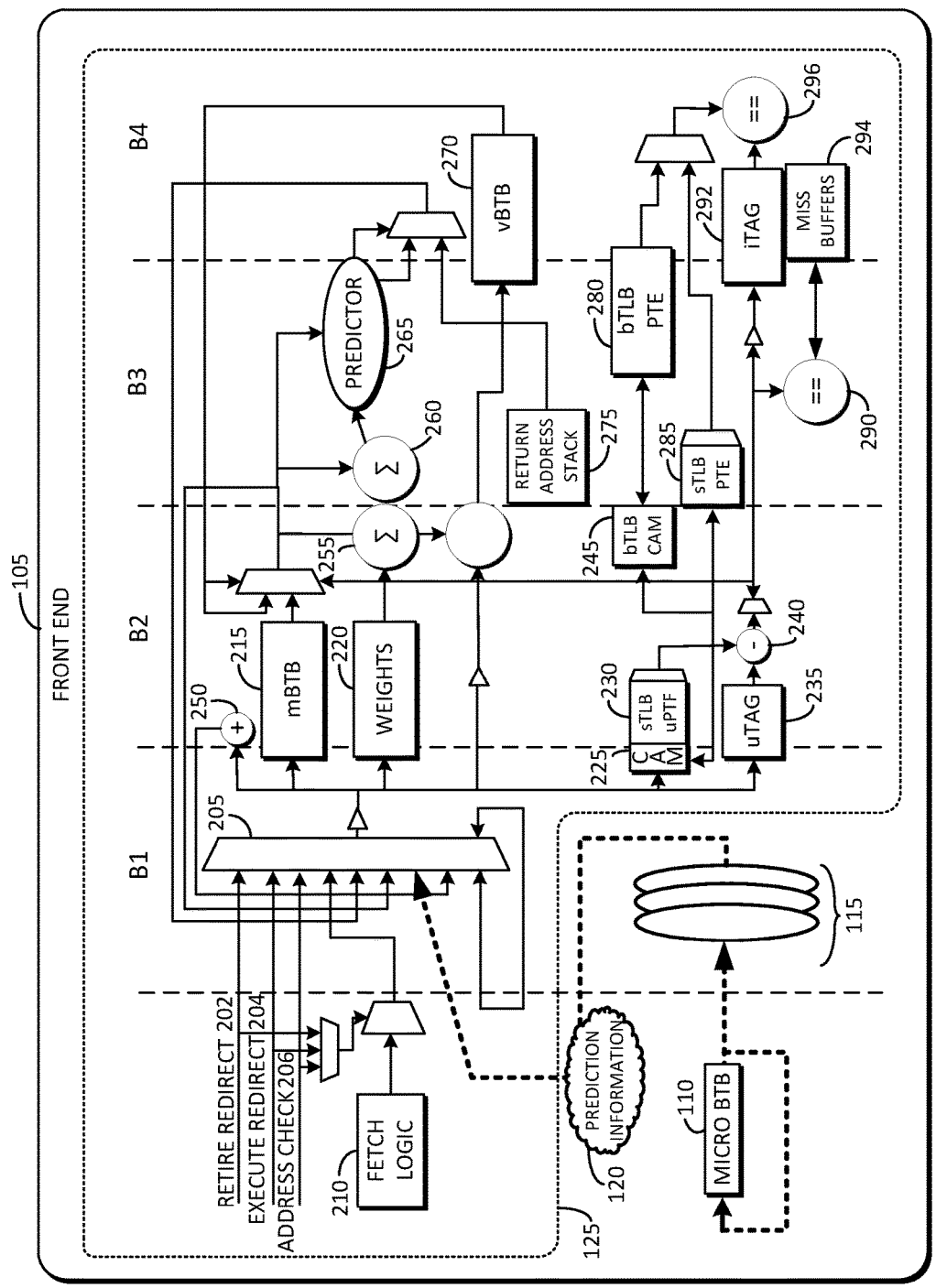
FIG. 2 is an example block diagram of the front end of the microprocessor of FIG. 1.
Figure 3:
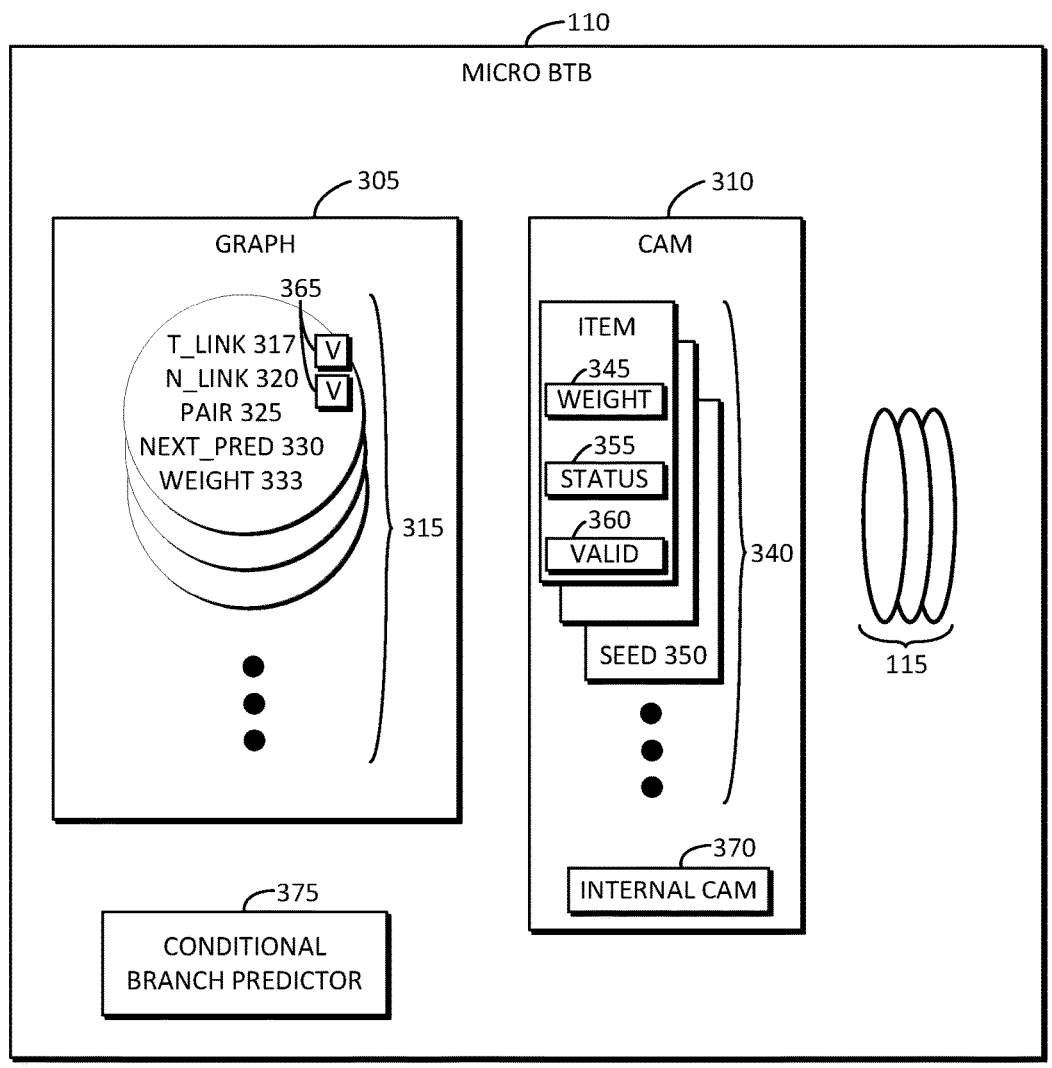
FIG. 3 is an example block diagram of the micro BTB of FIG. 1 in accordance with some embodiments.

FIG. 2 is an example block diagram of the front end 105 of the microprocessor 100 of FIG. 1. FIG. 3 is an example block diagram of the micro BTB 110 of FIGS. 1 and 2 in accordance with some embodiments. Reference is now made to FIGS. 1, 2, and 3.

The front end 105 can include the micro BTB 110 and the decoupling queue 115, which can provide the prediction information 120 to the main front end logic section 125. The main front end logic section 125 can include various selectors or multiplexors (e.g., 205), adders (e.g., 250, 255, 260), comparators (e.g., 240, 290, and 296), a return address stack 275, or the like. In addition, the main front end logic section 125 can include a main BTB (e.g., mBTB 215) and a virtual BTB (e.g., vBTB 270), which are separate from the micro BTB 110.

A BTB can be a structure that contains information about an address, target, class, and/or certain prediction state information of branches in the program 130 (of FIG. 1). The main BTB 215 and the virtual BTB 270 can include information about the branches in the program 130. The micro BTB 110 can capture the hot inner portion of the program 130 and allows for zero bubble taken prediction of branches that would otherwise incur a multiple cycle penalty if predicted by the main BTB 215 or the virtual BTB 270.

The main BTB 215 can hold a first one or two branches in program-order in a fetch window. A fetch window, for example, is a 32 byte-aligned block of an instruction address space. The virtual BTB 270 can hold additional pairs of branches that are given in a given fetch window. Fetching can include, for example, retrieving instruction data from a cache hierarchy or memory, predicting any branch instructions that are known to exist at the time, and aligning the instruction data to instruction positions for decode. The virtual BTB 270 can handle a relatively unlikely case where more than two branches reside in the given fetch window. A main conditional predictor 265 can be coupled to the mBTB 215, which can predict branches based on information such as weights 220 and information from the main BTB 215 in cases where the micro BTB 110 is not sufficiently confident in its prediction accuracy.

The main front end logic section 125 can also include one or more CAMs (e.g., 225 and 245) and/or one or more translation lookaside buffers (e.g., sTLB 230 and sTLB 285). In some embodiments, the front end logic section 125 includes an iTAG section 292 and/or a uTAG section 235. The main front end logic section 125 can also include a TLB page table entry (e.g., bTLB PTE 280) and/or miss buffers 294. The main front end logic section 125 can be divided into branch prediction pipe stages (e.g., B1, B2, B3, and B4). In the first branch prediction pipe stage (e.g., B1), the multiplexor 205 can receive input from and select from among a fetch logic 210, a retire redirect 202, an execute redirect 204, an address check 206, and/or the prediction information 120 from the micro BTB 110, or the like. Although the term "multiplexor" is used herein, it will be understood that such term can refer to any suitable kind of selector.

The micro BTB 110 can include a structure referred to herein as a graph 305, as shown in FIG. 3. The graph 305 is so called because it captures or otherwise reflects a "graph" of a program (e.g., 130 of FIG. 1) being executed on the microprocessor 100. The graph 305 can include one or more entries 315. It will be understood that any suitable number of entries 315 can be used, although in some embodiments, a 64-entry graph is used. Each entry 315 of the graph 305 can represent one branch inside a "hot" inner portion of the program 130 being executed on the microprocessor 100. Instead of accessing the micro BTB 110 using a fetch address and checking for a hit using a tag or micro-tag, T_LINK and N_LINK pointers (e.g., T_LINK 317 and N_LINK 320) can be stored in each graph entry 315. This allows each predicted not-taken or taken branch to have a pointer to a next branch in the graph 305 in a taken direction and/or a not-taken direction. Each of the T_LINK and N_LINK pointers (e.g., T_LINK 317 and N_LINK 320) can have associated therewith a valid bit 365, described in further detail below.

The graph 305 can be a graphical representation of the branches in the program 130 in which each graph entry 315 represents a single branch, each of which has graph edges (e.g., links such as T_LINK 317 and N_LINK 320), which point to the next entry 315 in the graph 305 along the taken and/or not-taken directions. Each link (e.g., T_LINK 317 and N_LINK 320) can be a six (6) bit pointer, for example, into the micro BTB graph 305. Links have certain advantages over CAMs, such as fewer logic gates, lower latency, and reduced power consumption. Each entry 315 can include a weight 333. In some embodiments, the weight 333 is an eight-bit weight. The weight 333 is described in further detail below.

If two branches are predicted by the main BTB 215 or the virtual BTB 270 as a pair that are predicted in parallel in the same cycle, the two branches can be stored in the graph 305 of the micro BTB 110 in two adjacent entries 315, the first of which can have a pair bit (e.g., pair bit 325) set indicating that the two branches should be predicted in parallel.

To avoid serializing access to the micro BTB 110 and micro BTB conditional branch direction prediction, each entry 315 in the micro BTB graph 305 can have a next predicted (NEXT_PRED) bit 330. In parallel with access to the micro BTB graph 305 for a current branch, a next value of the NEXT_PRED bit 330 for the current branch can be computed and written-back to the micro BTB graph entry 315. The choice of the next micro BTB graph entry 315 to read a following cycle is then a function of a current value of the NEXT_PRED bit 330, the T_LINK 317, and the N_LINK 320 for the current entry 315. If the current entry has its PAIR bit 325 set, then the NEXT_PRED bit 330, the T_LINK 317, and the N_LINK 320 for the adjacent entry 315 can also be taken into account. This improves timing paths in the micro BTB logic 110.

The micro BTB 110 can include three main components as shown in FIG. 3. For example, the micro BTB 110 can include the graph 305, a micro BTB CAM 310, and the decoupling queue 115. It will be understood that the decoupling queue 115 can be considered part of the micro BTB 110, or alternatively, separate from but associated with the micro BTB 110. The graph 305 can be used to predict the "hot" portions of the program 130 (of FIG. 1) that can fit into the graph 305. But before such fitting is performed, the CAM 310 of the micro BTB 110 can determine where the hot inner portions are located. The CAM 310 can include multiple items 340. It will be understood that the CAM 310 can include any suitable number of items 340, although in some embodiments, the CAM 310 includes 16 items. Each item 340 can include a weight 345. In some embodiments, the weight 345 is an eight-bit weight. The weight 345 is described in further detail below. Each item 340 can include a status bit 355 and a valid bit 360, as further described below. An item 340 can also be designated a "seed" entry 350, as further described below. The CAM 310 can include an internal CAM 370, as also further described below.

The CAM 310 can be a fully associative structure. Each item 340 can hold, for example, up to two branches that can be paired in a main or virtual BTB entry (e.g., "bucket") and predicted in parallel. Branches that are resolved as taken that are marked in either the main BTB 215 or the virtual BTB 270 can be eligible for insertion into the micro BTB CAM 310 after commit if they are backward in direction. The term "commit" as used herein means that instruction results are ready and all previous waypoints have been resolved. The eligible branches can be the potential graph "seeds," or in other words, the first entry 315 inserted into the micro BTB graph 305 for a new or otherwise modified potential branch prediction graph 305. Put differently, the micro BTB CAM 310 can discover "hot" backward-taken "seed" branches post-commit, which form the starting point for program graph construction in the graph 305. The micro BTB CAM 310 is a separate structure that is much smaller than either the micro BTB graph 305 or a traditional BTB with its large power hungry CAMs. Once the micro BTB 110 "locks on," the micro BTB CAM 310 can be powered down, thereby conserving energy. The micro BTB 110 can also include a conditional branch predictor 375, as further described below.

Figure 4:
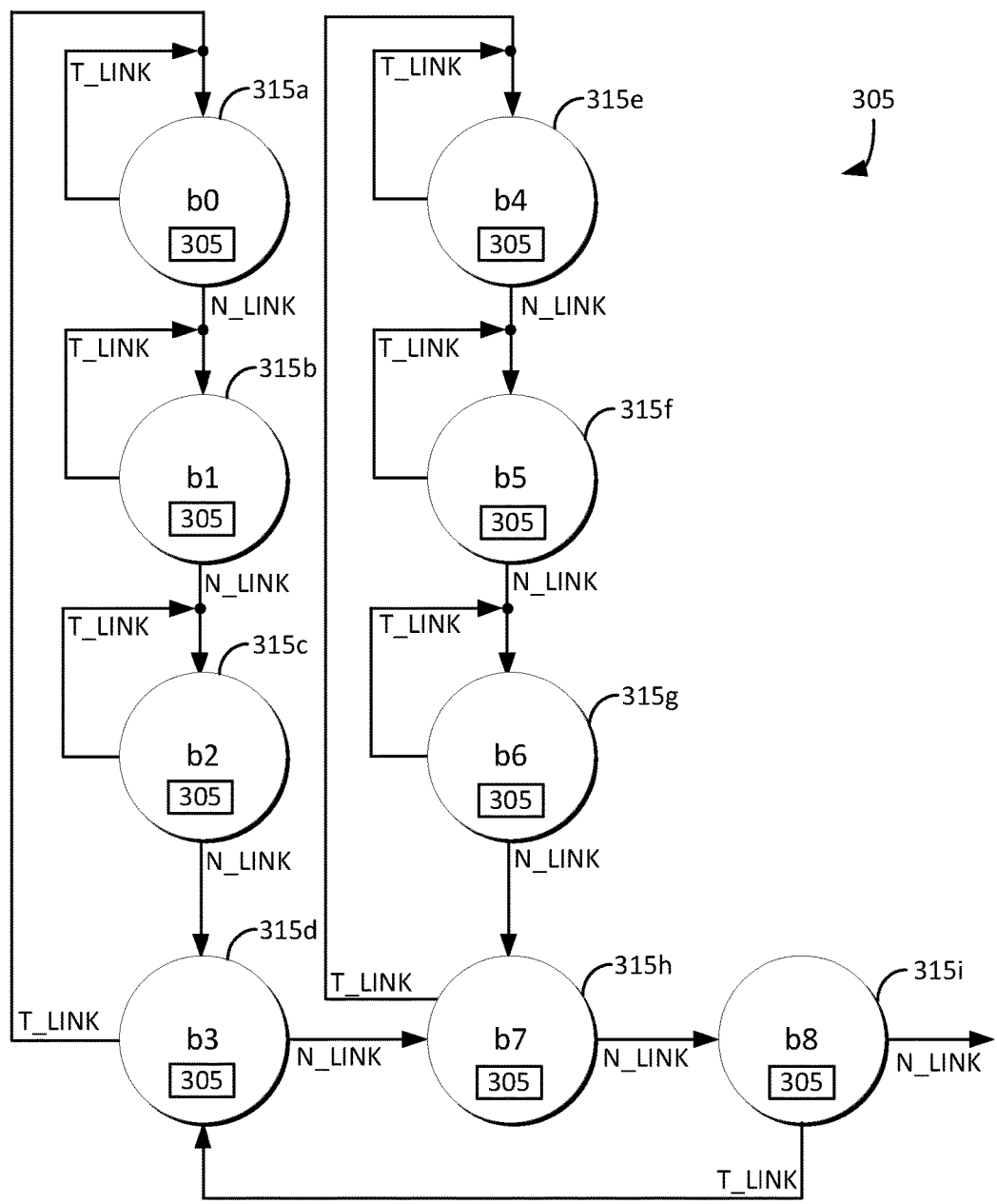
FIG. 4 is example diagram of a branch instruction graph associated with the micro BTB of FIG. 1 in accordance with some embodiments.

FIG. 4 is an example diagram of a branch instruction graph 305 associated with the micro BTB 110 of FIG. 1 in accordance with some embodiments. Reference is now made to FIGS. 1, 2, 3 and 4.

The micro BTB 110 can include or otherwise represent the branch instructions in the "hot" inner portions of the program 130 (of FIG. 1) as the graph 305. Each graph entry (e.g., 315a through 315i) represents one branch, with edges or links that connect to other nodes along the taken and not-taken directions. Graph nodes are individual entries 315 in the micro BTB graph 305. The graph edges can be stored in the micro BTB graph 305 as six (6) bit pointers, or "links," that can point directly to the next branch's node (i.e., entry). It will be understood that the graph edges can be stored in the micro BTB graph 305 using bit pointers that have any suitable number of bits. A node has a taken, or "T_LINK" link or pointer from the current branch's node to the next branch to be predicted if the current branch is predicted taken. If the current branch has exhibited dynamic behavior in the past it can also have a not-taken, or "N_LINK" link to the next branch to be predicted if the current branch is predicted not-taken.

An example program 130 (of FIG. 1) can have, for example, nine branches, each of which can be represented in the associated graph 305 as b0 through b8 as shown in FIG. 4. The individual entries 315 of the graph 305 each have a T_LINK link and an N_LINK link that can point to the next branch to be predicted if the current branch is predicted taken (i.e., the T_LINK) or not-taken (i.e., the N_LINK). Each micro BTB graph entry (e.g., 315a through 315i) can include additional state information such as a target address of the branch and/or a next predicted direction (e.g., NEXT_PRED bit 330 of FIG. 3) that is used to decide whether to follow the T_LINK link or the N_LINK link to the next branch to be predicted after the current branch is predicted.

The micro BTB graph 305 illustrated in FIG. 4 can represent the branches for a given pseudo-code nested loop example, such as the following:

```
d = 0
for a = 0; a < 1000; a++              //b8
    for b = 0; b < 5; b++             // b3
        for c = 0; c < 2; c++         // b0
t1: d++
    if d/3 is an integer
        jmp t1 // b1
    for e = 0; e < 4; e++             // b2
    for f = 0; f < 9; f++             // b7
        for g = 0; g < 6; g++         // b4
        for h = 0; h < 7; h++         // b5
        for i = 0; i < 8; i++         // b6
```

As mentioned above, branches that are resolved as taken that are marked in either the main BTB 215 or the virtual BTB 270 can be eligible for insertion into the micro BTB CAM 310. The eligible branches can be the potential graph "seeds," or in other words, the first entry 315 inserted into the micro BTB graph 305 for a new or otherwise modified potential branch prediction graph 305. These potential seeds can be compared against the items 340 (of FIG. 3) of the micro BTB CAM 310 (of FIG. 3) post-commit to see if they are already resident in the micro BTB CAM 310. If a potential seed is not resident in the micro BTB CAM 310 and a CAM replacement policy allows insertion at that time, a new seed entry 350 (of FIG. 3) can be inserted into the micro BTB CAM 310. The micro BTB CAM 310 can use the eight-bit weights 345 (of FIG. 3) per item 340 for both the CAM replacement policy and to detect when a branch in a given item 340 of the BTB CAM 310 is "hot" enough to warrant insertion into the micro BTB graph 305 as a new seed 350. In some embodiments, the criteria for determining whether a particular branch is eligible for insertion into the BTB CAM 310 can be that the particular branch is backward in direction in addition to being taken. In some embodiments, the branches do not have to be backward in direction. For example, the branches can be forward in direction in some cases (e.g., subroutine call whose corresponding return was mis-predicted because the micro BTB 110 was not locked on when the call was fetched), as further described below.

If a committed, backward-taken branch is already resident in the BTB CAM 310 then its replacement policy weight 345 can be incremented. For example, the weight 345 can be an eight-bit value, which saturates at 255 (decimal). If the CAM-resident committed seed has a replacement policy weight 345 that is greater than or equal to a threshold such as THETA (e.g., 42 decimal), for example, then the seed 350 is considered "hot" and an attempt can be made to insert the seed 350 into the micro BTB graph 305 if it is not already there as indicated by the status bit 355 in the CAM item 340. Graph insertion can be done when there is an invalid graph entry 315, or a valid graph entry 315 with a replacement policy weight 333 that is equal to zero. If either situation is found, the seed 350 can be inserted into the graph 305, and the entry number into which it was inserted can be copied back into the CAM item 340 for the seed 350. Moreover, the valid bit 360 can be set in the CAM item 340 indicating that an item 340 has been allocated into the graph 305. If an item 340 cannot be found in the graph 305, then the replacement policy weights (e.g., 333) for one group of eight entries (e.g., 315) selected on a round-robin basis in the graph 305 can be decremented. Alternatively, all of the graph weights (e.g., 333) can be decremented in parallel.

In addition to holding the dominant backward-taken "seeds," any other branch that is in the same "bucket" of the main BTB 215 (of FIG. 2) or the virtual BTB 270 (of FIG. 2) as a seed that is already resident in a micro BTB CAM item 340 can be added to a "bucket" of the micro BTB CAM 310 once the seed that is already resident has been inserted into the micro BTB graph 305. These non-seed branches can then be used to "lock on" the micro BTB 110 if the micro BTB CAM 310 determines that they are fetched and are more likely to be taken than the seed, thereby improving the ability of the micro BTB 110 to lock on and predict branches.

Once at least one seed 350 is in the micro BTB graph 305, the micro BTB 110 can then try to build the rest of a branch graph associated with the program 130 in the graph 305 that the seed 350 belongs to. This can be done by having committed branches that are already resident in a CAM of the main BTB 215 or the virtual BTB 270 against the entries 315 of the micro BTB graph 305 post-commit. If a current committed branch is resident in the graph 305 and a previously committed branch is not, then the previously committed branch can be made eligible for insertion into the graph 305 if "Meander" criterion are met. In some embodiments, the Meander criterion states that the number of committed branches in a row since the last graph "hit" was detected is less than the size of the graph 305. In some embodiments, the size of the graph 305 can be 64 entries. The Meander criterion prevents the building of a program graph 305 that will not fit in a certain-sized micro BTB graph 305. For example, if the micro BTB graph 305 has a size of 64 entries, then the Meander criterion prevents the building of a program graph 305 that exceeds 64 entries.

If the Meander criterion is satisfied, the previously committed branch can be added to a free or replaceable entry 315 in the graph 305 if one is available. If an entry 315 is found, the previous branch can be inserted into the graph 305 and a link to the current branch's entry (that is already resident in the graph 305) can be added to the T_LINK field (e.g., T_LINK 317) of the previous branch, if the previous branch was resolved as taken. Otherwise, the link can be added to the N_LINK field (e.g., N_LINK 320) of the newly inserted previous branch. In this manner the graph 305 that the seed 350 belongs to can be successively built starting at the seed 350 itself and working backwards. The graph 305 can be built backwards in order to be conservative due to the small number of available entries in the micro BTB graph 305. The T and N links (e.g., T_LINK 317 and N_LINK 320) can also include valid bits 365 that can be set when the corresponding link field is written or otherwise valid. Such valid bits 365 can be used to detect when the graph 305 tries to follow an invalid link. When that situation is detected, the micro BTB 110 can stop predicting branches and reads of the graph 305 can be halted in order to save power and to avoid main/virtual BTB redirects due to mis-speculation by the micro BTB 110.

In some embodiments, the entries 315 of the micro BTB graph 305 can be built in a "forward" direction starting from an existing branch already in the graph 305 and adding new branches as they commit, and connecting the committed branches to the previously added branch. This has the advantage of building or re-constructing the entries 315 of the graph 305 faster than building the graph 305 in a backwards direction. Such forward building of the graph 305 can be constrained such that useful entries 315 of the graph 305 are not evicted prematurely.

If the previously committed branch and currently committed branch are both in the same "bucket" of the main BTB 215 or the virtual BTB 270 (i.e., eligible for prediction in the same cycle as a pair of branches by the main prediction structures), and the previously committed branch was resolved not-taken, but they are not already located in physically adjacent entries 315 of the graph 305, then contents of the graph 305 for the current branch can be moved forward or "shuffled" one position, modulo the size of the graph 305. The previous branch can be written into the former location of the current branch. The PAIR bit 325 for the previous branch—the first branch in the "bucket," can then be set. This can indicate that when the first branch in the bucket is read while locked on, it should be "paired" with the branch located after it in the graph 305 and both branches sent to the decoupling queue 115 for prediction in parallel. For example, placing paired branches (e.g., A and B) into adjacent graph entries 315 (e.g., X and X+1) makes it simple to read the paired branch B in entry X+1 when a predicted branch (e.g., C) follows its taken or not-taken link to the branch A in entry X. This allows the micro BTB graph 110 to predict both branches A and B in parallel in the same cycle at high frequency without wasting power. Any valid branch that may already be resident in the graph entry 315 that the current branch was shuffled onto can be simply overwritten, and any other entries 315 in the graph 305 that may have links to that entry need not be corrected at that time.

If both the previously committed branch and currently committed branch are both resident in the graph 305, but the previous branch's link along its committed direction does not point to the currently committed branch, then the link can be corrected. In a similar manner, all other state information corresponding to the previously committed branch can be corrected such as target, branch type, or the like. This mechanism ensures that incorrect links created by shuffling of the graph 305 and branch type reclassifications, etc., can eventually be corrected. While incorrect links can cause the micro BTB 110 to mis-predict a branch, all predictions associated with the micro BTB 110 can be verified farther down the pipeline by either the main BTB 215 or the virtual BTB 270, or by the execution cluster if the main BTB 215 or the virtual BTB 270 are powered down due to high prediction confidence of the micro BTB 110. As can be seen in FIG. 4, each entry 315 in the graph 305 can have its own replacement policy weight 333 that are separate from the replacement policy weights 345 of the BTB CAM 310 (of FIG. 3).

Figure 5:
FIG. 5 is an example block diagram of different branch prediction pipelines including one for the micro BTB of FIG. 1 in accordance with some embodiments.
Figure 5:
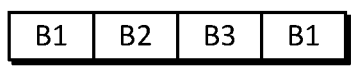

FIG. 5 is an example block diagram of different branch prediction pipelines 500 including one for the micro BTB 110 of FIG. 1 in accordance with some embodiments. Reference is now made to FIGS. 1, 2, 3, and 5.

The main BTB branch prediction pipeline as shown at 510 is four stages starting with address/history selection and ending with actual/predicted address/way information used to fetch instructions from an instruction cache. Decoupled from the main BTB branch prediction pipeline is an instruction fetch pipeline. Address, way, and history information are selected in B1. Main branch prediction arrays are read in B2. An accurate direction prediction is made in B3 with the redirect occurring in B4. The branch predictor can have several key loops in the microarchitecture.

In contrast, the micro BTB 110 (of FIG. 1) provides forecasted predictions with zero bubble latency, as shown at 505. The main predictor (i.e., main BTB 215 and/or predictor 265 of FIG. 2) provides an accurate prediction with two bubbles latency for the first two branches in a given 32 byte fetch window when it predicts a branch as taken. There is no such penalty for a not-taken prediction.

Figure 6:
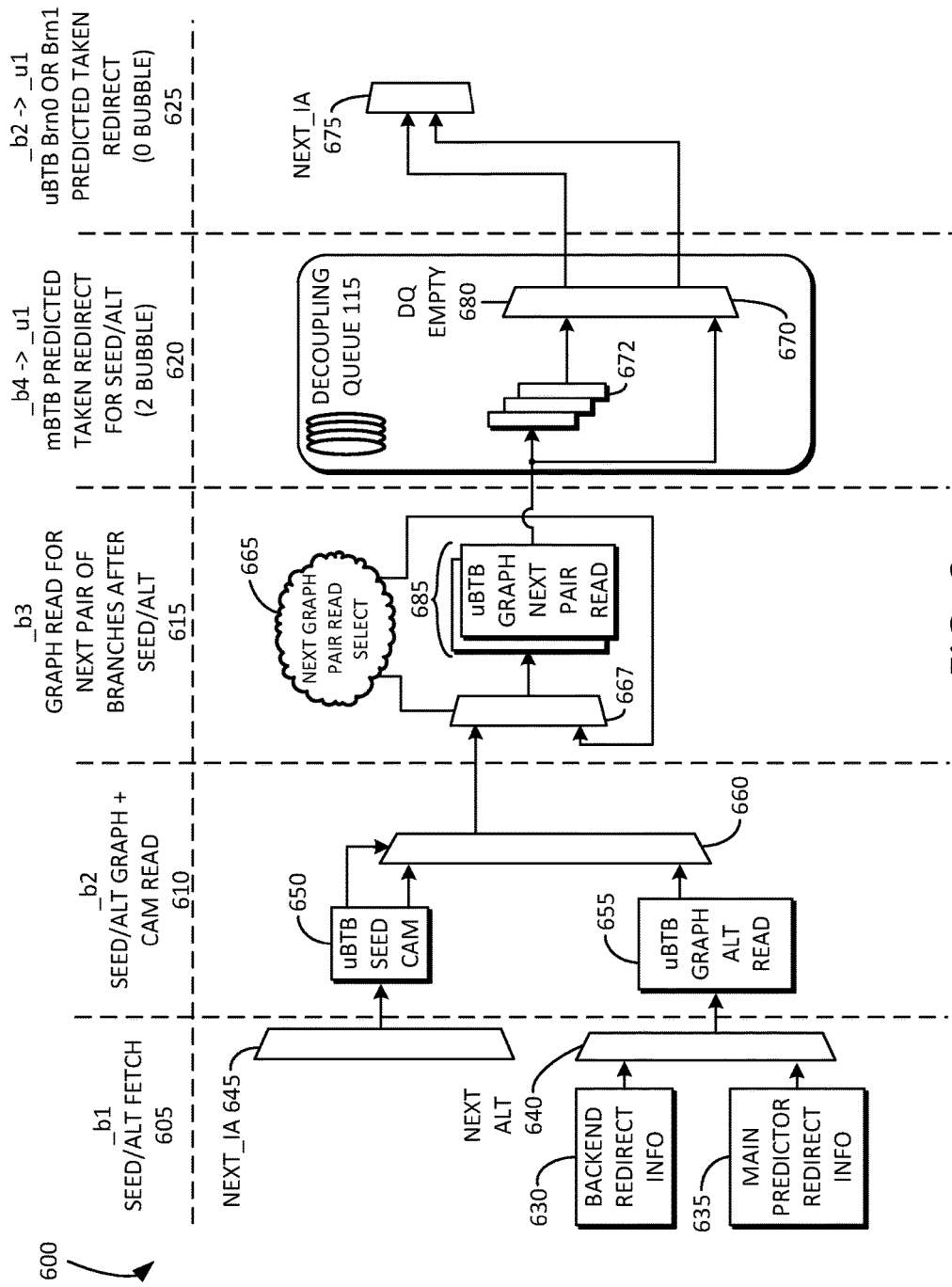
FIG. 6 is an example block diagram of a fetch pipeline procession in accordance with some embodiments.

FIG. 6 is an example block diagram of a fetch pipeline procession 600 in accordance with some embodiments. Reference is now made to FIGS. 1, 2, 3, and 6.

The fetch pipeline procession 600 can include a first branch stage 605 (e.g., B1 or _b1) associated with a fetch of a seed, a second branch stage 610 (e.g., B2 or _b2), a third branch stage 615 (e.g., B3 or _b3), a fourth branch stage 620 (e.g., B4 or _b4) associated with a redirect of the pipeline for the seed, and a fifth branch stage 625 (e.g., _b2->_b1) associated with a redirect for the first predicted taken branch after the seed.

Once the graph 305 of the micro BTB 110 has been populated with the hot inner portion of the program 130 (of FIG. 1), the micro BTB 110 can "lock on" in order to start making predictions with the graph 305. This is not done post commit. Rather, the lock on can be performed by examining a stream of fetch addresses early in the pipeline and detecting when instruction fetch has entered a program and associated graph 305 resident in the micro BTB 110. This is done by using an internal CAM 370 in the micro BTB CAM 310, which can examine the active fetch addresses in a second branch stage (e.g., B2 or _b2) of the front end 105 (of FIG. 1). If a match is found in the micro BTB CAM 310, then the front end 105 is fetching a "seed" that is resident in the micro BTB CAM 310 and graph 305. On a hit in the micro BTB CAM 310 corresponding to an entry 315 in the graph 305 with a valid T_LINK (e.g., T_LINK 317), a hit indication can be sent to the micro BTB graph 305, along with a subset of graph information associated with the seed including the T_LINK link (e.g., T_LINK 317) of the seed, which can be cached locally in the micro BTB CAM 310 along with a valid bit (e.g., 360).

The seed information can be received by the micro BTB graph in the second branch stage (e.g., B2 or _b2) and the seed's T_LINK (e.g., T_LINK 317) can be used to read a pair of entries 315 of the graph 305 corresponding to the T_LINK of the seed and T_LINK+1 in a third branch stage (e.g., B3 or _b3). The T_LINK (e.g., T_LINK 317) of the seed can point to the next branch that is likely to be fetched assuming the seed branch is predicted taken by the main predictor 265.

This pair of entries 315 of the graph 305 can correspond to the next branch in which the PAIR bit 325 is cleared for the seed's T_LINK entry, or two branches in which the PAIR bit 325 is set for the seed's T_LINK entry, which can be predicted by the front end 105 if the seed is predicted taken by the main predictor 265 in the fourth branch stage (e.g., B4 or _b4) of the pipeline of the front end 105. If the branch address of the seed in the micro BTB graph 305 matches that stored by the main BTB 215 or the virtual BTB 270 in the fourth branch stage (e.g., B4 or _b4), and a main or virtual redirect of the front end 105 occurs in the fourth branch stage (e.g., B4 or _b4), then the micro BTB graph 305 can start predicting branches, with the first two branches predicted starting at the T_LINK of the seed, whose entries 315 of the graph 305 were read in the previous cycle. This is how the micro BTB 110 can "lock on" and start predicting branches.

The micro BTB 110 can predict the first pair of branches to be fetched after the redirect for the seed branch as early as the first cycle after the seed is predicted taken by the main predictor 265, i.e., "zero bubble" prediction. Once the micro BTB 110 is locked on, it can continue to predict pairs of branches and redirect fetch for branches that it predicts taken without inserting pipeline bubbles. The micro BTB 110 can continue to read pairs of entries 315 of the graph 305 each cycle and send their predictions to the main predictors (e.g., 265) of the main front end logic section 125 until it experiences backpressure from running too far ahead of the main predictors (e.g., 265), the main predictors (e.g., 265) disagree with a micro BTB prediction and redirect the front end in the fourth branch stage (e.g., B4 or _b4), the micro BTB 110 tries to follow an invalid link, and/or a redirect from farther down the pipeline occurs.

When the micro BTB graph 305 is read for the current pair of branches, the micro BTB graph 305 can examines their NEXT_PRED predicted direction bits (e.g., 330 of FIG. 3), PAIR bit (e.g., 325 of FIG. 3) of the first branch, T_LINKs (e.g., T_LINK 317 of FIG. 3), and/or N_LINKs (e.g., N_LINK 320 of FIG. 3) to decide where the next pair of branches to be predicted is located in the graph 305. That pair can be read the following cycle. The following pseudo-code depicts an example of how the next link can be computed:

```
NEXT_LINK = Graph[CURRENT_LINK].NEXT_PRED ?
Graph[CURRENT_LINK].T_LINK :       //b0 taken
    ( Graph[CURRENT_LINK].PAIR
    & Graph[CURRENT_LINK+1].NEXT_PRED
    ) ? Graph[CURRENT_LINK+1].T_LINK : //b0 not-taken,
    b1 taken
    ( Graph[CURRENT_LINK].PAIR
    & ~Graph[CURRENT_LINK+1].NEXT_PRED
    ) ? Graph[CURRENT_LINK+1].N_LINK : //b0 and b1 not
    taken
        Graph[CURRENT_LINK].N_LINK;   //b0 not-taken
```

As shown in FIG. 6, the first branch stage 605 can include a NEXT ALT multiplexor 640, which can receive and select among backend redirect information 630 and main predictor redirect information 635. The first branch stage 605 can further include a next instruction address (NEXT_IA) multiplexor 645, which can output micro BTB seed CAM information 650, where IA refers to an instruction address of the instruction or fetch window. At the second branch stage 610, a multiplexor 660 can receive and select among the micro BTB seed CAM information 650 and the micro BTB graph alt read information 655.

At the third branch stage 615, a multiplexor 667 can receive and select among an output of the multiplexor 660 and from a next graph pair read select 665. The next graph pair read select 665 can also control the multiplexor 667. The multiplexor 667 can output one or more micro BTB graph next pair reads 685. At the fourth branch stage 620, the decoupling queue 115 can receive the one or more micro BTB graph next pair reads 685. The decoupling queue 115 can include a queue 672 and a multiplexor 670. The multiplexor 670 can receive and select from among an output of the queue 672 and information associated with the one or more micro BTB graph next pair reads 685. The multiplexor 670 can be controlled by a DQ empty signal 680. At the fifth branch stage 625, a NEXT_IA multiplexor 675 can receive information output from the decoupling queue 115.

Figure 7:
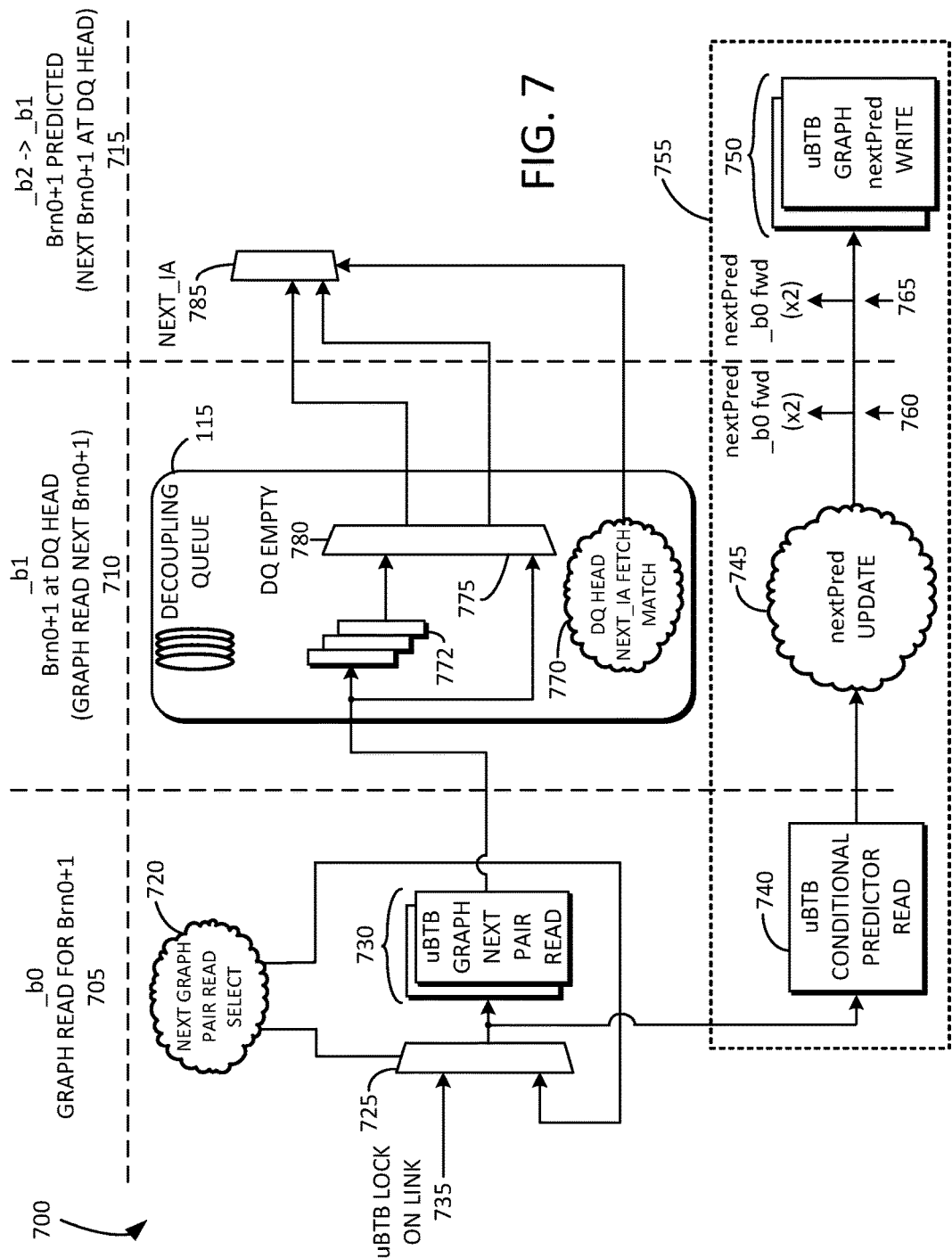
FIG. 7 is an example block diagram of a micro BTB pipeline in accordance with some embodiments.

FIG. 7 is an example block diagram of a micro BTB pipeline 700 in accordance with some embodiments. In this example, the micro BTB pipeline 700 is illustrated while it is locked on and predicting up to two branches per cycle without injecting pipeline bubbles. Reference is now made to FIGS. 1, 2, 3, 6, and 7.

Predicted branches of the micro BTB graph 305 can sit in the decoupling queue 115 and their addresses can be compared to a current fetch address in the first branch stage (e.g., B1 or _b1). If fetch has advanced to a pair of branches at the head of the decoupling queue 115, then they are predicted in the first branch stage (e.g., B1 or _b1). If either branch was predicted taken, the front end 105 can be redirected at the beginning of the second branch stage (e.g., B2 or _b2), thereby starting a new _b1 cycle in which the next pair of branches associated with the micro BTB 110 at the updated head of the decoupling queue 115 are eligible for prediction. In this way, the micro BTB 110 can sustain up to two predicted branches per cycle without injecting pipeline bubbles.

In addition to reading the graph 305 for the current pair of branches, the NEXT_PRED bits (e.g., NEXT_PRED 330) can be updated for either or both predicted branches if they are in a dynamic conditional state. This can be done by accessing one of the conditional branch direction predictors of the micro BTB 110, predicting the next outcome of the branch(es), then writing the updated next prediction back to the NEXT_PRED bit(s) (e.g., NEXT_PRED 330) in the graph 305. The current prediction can be already read out of the graph 305 and can be used to determine the next pair of entries 315 of the graph 305 to be read. This decouples graph reads from prediction, allowing the micro BTB 110 to hit its aggressive target frequency without injecting pipeline bubbles.

After the micro BTB graph 305 locks on, it can send pairs of predicted branches to the main front end logic section 125 through a three entry decoupling queue 115, and can continue to read entries 315 of the graph 305, predict branches, and push branches to the main front end logic section 125 as long as the decoupling queue 115 does not exhibit backpressure. Graph reads can restart once backpressure eases as long as lock is maintained. At least two entries in the decoupling queue 115 are needed. The third entry in the decoupling queue 115 can act as a skid buffer to eliminate timing paths between prediction logic that examines the predictions of the micro BTB 110 at the head of the decoupling queue 115, and read control logic of the micro BTB graph 305.

The entries of the decoupling queue 115 can contain branch offset information, target information, predicted direction information, and/or other state information that is needed to redirect instruction fetch. Control logic of the decoupling queue 115 can examine a pair of branches at the head of the decoupling queue 115 (if not empty) or the pair being sent from the micro BTB graph 305 (if empty), and can compare their addresses versus the current fetch address in the first branch stage (e.g., B1 or _b1) of the pipeline. If a valid branch or pair of branches is found and they belong to the current fetch window, they can be de-allocated from the decoupling queue 115 (if the decoupling queue 115 is not empty and the decoupling queue 115 head is updated). Also, if one of them was predicted taken, fetch can be redirected to the predicted target of the micro BTB 110 at the beginning of the next cycle. If the branch(es) are not-taken, then fetch can simply sequentially advance. In this manner, the predicted-taken branch bubbles are hidden by micro BTB prediction.

The entries of the decoupling queue 115 can also be used to "unwind" and correct speculatively updated conditional branch predictor state of the micro BTB 110 when misspeculation of the micro BTB 110 is discovered. Pipeline state can also be used to unwind and correct speculatively updated prediction state of the micro BTB 110 for branches that have been pulled out of the decoupling queue 115 and used to predict instruction fetch in the shadow of either a redirect of a main predictor (e.g., 265) or any other redirect from farther down the pipeline.

If the main BTB 215, the virtual BTB 270, and/or a main conditional predictor 265 disagree about a branch offset of a branch prediction of the micro BTB 110, direction, or target, then the micro BTB 110 can have its lock "broken." In this scenario, the decoupling queue 115 can be flushed, graph reads associated with the graph 305 can be stopped, fetch time CAM operations can be re-enabled in an attempt to re-acquire lock, and conditional branch state in the graph 305 can be repaired if necessary.

If lock was broken as previously described, and a hit associated with the micro BTB CAM 310 is not discovered in the same cycle, then an "alternate" link can be passed back to the micro BTB graph 305 and an attempt can be made to re-acquire lock by going down the other direction. For example, if the micro BTB graph 305 is locked on and makes a taken prediction for a particular entry A from among the entries 315 of the graph 305, the graph 305 can follow its TAKEN link (e.g., T_LINK 317), but it will record the NOT_TAKEN link (e.g., N_LINK 320), and pass it down the pipeline. If the graph entry A actually resolves as NOT_TAKEN, then an attempt can be made to relock the micro BTB graph 305 by treating the branch pointed at by the NOT_TAKEN link (e.g., N_LINK 320) as a seed in a manner similar to that for CAM locking. This also works for the TAKEN link (e.g., T_LINK 317) if the graph 305 mis-predicted a branch not-taken and followed a NOT_TAKEN link (e.g., N_LINK 320). The alternate itself can be either taken or not-taken. Two alternates can be used per cycle because the micro BTB 110 can predict up to two branches per cycle.

These "alternates" can lock on if either taken or not-taken. Taken alternates locks are conceptually identical to seed locks with respect to the pipeline because the pipeline can be redirected in the fourth branch stage (e.g., B4 or _b4). Not-taken alternates are relatively more complicated. If relock onto a not-taken alternate is attempted, the micro BTB graph 305 is only able to get the next pair of branches after the not-taken alternate to the head of the decoupling queue 115 in time to be predicted if there are no branches predicted by the main BTB 215 or the virtual BTB 270 in the following two cycles. These not-taken relocks can be referred to as "speculative" relocks. If a branch is predicted by the main BTB 215 or the virtual BTB 270 in the two cycle window, then the speculative lock can be broken. If the speculative lock is not broken, then the micro BTB 110 can maintain lock and can continue to predict branches until the decoupling queue 115 fills up due to backpressure, and/or due to redirect occurring. If there any branches in the main pipeline during the two cycle window, a first pair of branches after the not-taken alternate can arrive too late to be predicted, thereby causing the micro BTB 110 to be behind the main pipeline (and possibly never catch up). When this situation is detected, the speculative lock can be broken.

If the micro BTB 110 becomes sufficiently confident in its prediction accuracy once locked on, then the micro BTB 110 can power down or cause to be powered down the main prediction structures such as the main BTB 215, the virtual BTBs 270, and/or the main conditional predictor 265. With sufficient confidence additional power optimizations can be performed such as powering down the TLBs, L1 instruction cache tag arrays, etc. Note that the execution unit will still verify the correctness of branch predictions when this happens. The Micro BTB can also power down the front end commit pipeline, halting all Micro BTB Graph and CAM post-commit functions and only expending power on Micro BTB predictions until Micro BTB lock is broken. This provides a substantial power savings for many programs running on a processor.

As shown in the micro BTB pipeline 700 of FIG. 7, a first lock stage 705 can be followed by a second lock stage 710, which can be followed by a third lock stage 715. At the first lock stage 705, a multiplexor 725 can receive and choose from among a micro BTB lock on link signal 735 and a next graph pair read select 720. The multiplexor 725 can output one or more micro BTB graph next pair read 730. The multiplexor 725 can be controlled by the next graph pair read select 720.

At the second lock stage 710, the decoupling queue 115 can receive the one or more micro BTB graph next pair read 730. The decoupling queue 115 can include a queue 772 and a multiplexor 775. The multiplexor 775 can receive and select from among an output of the queue 772 and information associated with the one or more micro BTB graph next pair reads 730. The multiplexor 775 can be controlled by a DQ empty signal 780. The decoupling queue 115 can include or otherwise generate a decoupling queue head NEXT_IA fetch match signal 770. At the third lock stage 715, a NEXT_IA multiplexor 785 can receive information output from the decoupling queue 115. The multiplexor 785 can be controlled by the decoupling queue head NEXT_IA fetch match signal 770.

In some embodiments, the micro BTB pipeline 700 can include a micro BTB conditional branch condition section 755, which can span the first lock stage 705, the second lock stage 710, and the third lock stage 715. At the first lock stage 705, a micro BTB conditional predictor read 740 can occur. At the second lock stage 710, a subsequent prediction update 745 can be performed. At 760, a subsequent prediction forward can be performed. At 765, a second subsequent prediction forward can be performed. At the third lock stage 715, one or more micro BTB graph next prediction writes 750 can be performed.

Figure 8:
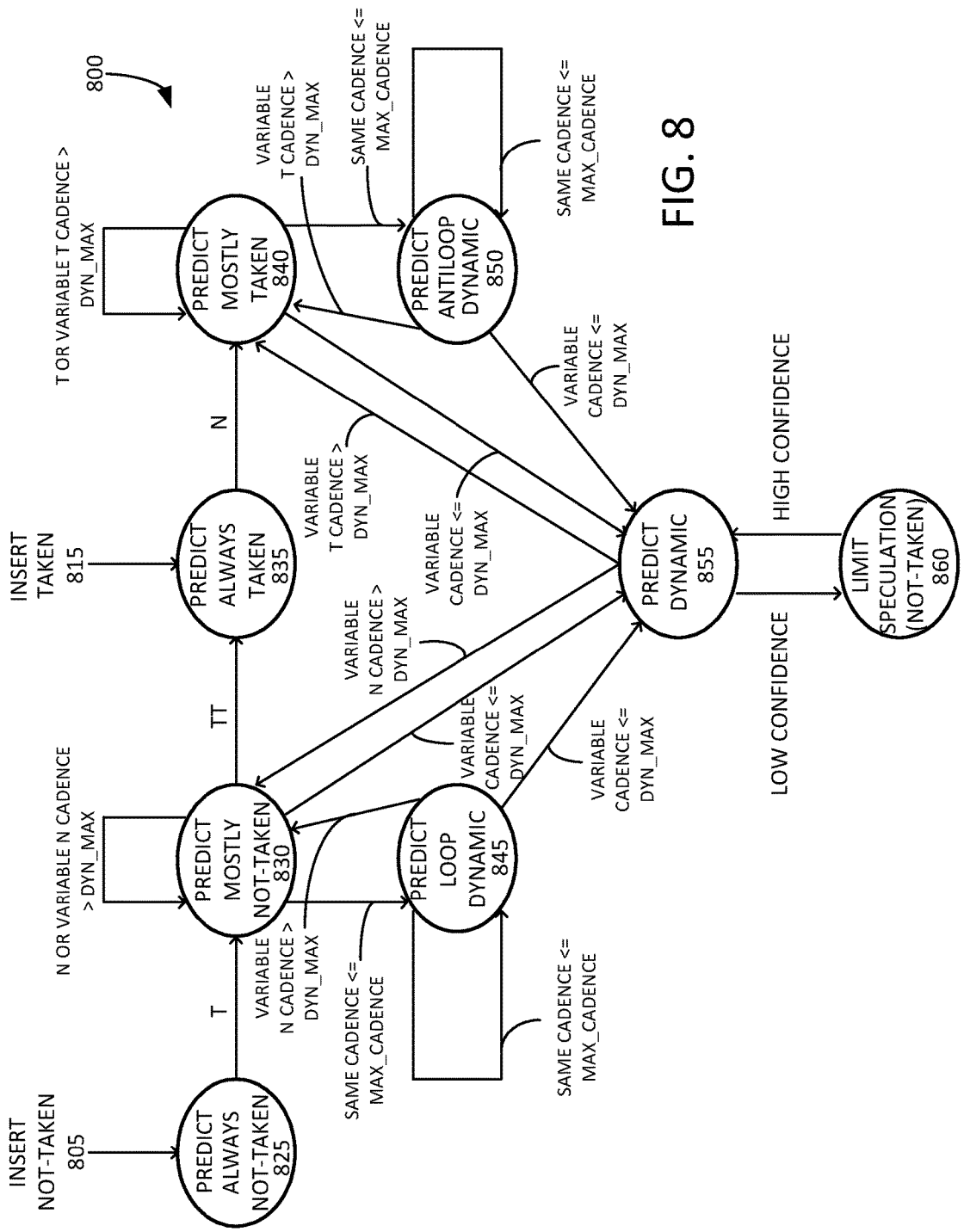
FIG. 8 is a state diagram illustrating an example implementation of state transitions from one predictor classification to another in accordance with some embodiments.

FIG. 8 is a state diagram 800 illustrating an example implementation of state transitions from one predictor classification to another in accordance with some embodiments. Reference is now made to FIGS. 1, 2, 3, and 8.

The conditional branch predictor 375 of the micro BTB graph 305 can have several components that are used to predict branches associated with the micro BTB 110. For example, the conditional branch predictor 375 can include a static predictor or prediction state in which branches that have always resolved as taken (e.g., 815) are in an ALWAYS_TAKEN 835 state and can be predicted as taken until either the main predictor 265 or an execution unit redirect the micro BTB 110 prediction to NOT_TAKEN. Conversely, the conditional branch predictor 375 can include a static predictor or prediction state in which branches that have always resolved as not-taken (e.g., 805) are in an ALWAYS_NOT_TAKEN 825 state and can be predicted as not taken until either the main predictor 265 or an execution unit redirect the micro BTB 110 to a different prediction.

By way of another example, the conditional branch predictor 375 can include a highly biased conditional branch predictor or prediction state in which branches that exhibit dynamic behavior, but exhibit long runs of taken or not-taken branches, can be classified as either MOSTLY_TAKEN 840 or MOSTLY_NOT_TAKEN 830 branches. MOSTLY_TAKEN 840 branches can always be predicted as taken until their behavior changes. Similarly MOSTLY_NOT_TAKEN 830 branches can be predicted as not-taken.

By way of yet another example, the conditional branch predictor 375 can include a loop conditional branch predictor or prediction state in which branches that exhibit dynamic behavior, but have a repeating sequence of TAKEN outcomes having a number that is less than or equal to a MAX_CADENCE followed by a single NOT_TAKEN outcome, can be classified as loops and can be predicted by a loop predictor 845.

By way of still another example, the conditional branch predictor 375 can include an anti-loop conditional branch predictor or prediction state in which branches that exhibit dynamic behavior, but have a repeating sequence of NOT_TAKEN outcomes having a number that is less than or equal to a MAX_CADENCE followed by a single TAKEN outcome, can be classified as anti-loops and can be predicted by an anti-loop predictor 850.

By way of still another example, the conditional branch predictor 375 can include one or more dynamic conditional branch predictors or predictions in which branches that exhibit dynamic behavior, but without a strong bias in either the taken or not-taken direction, or a repeating TAKEN or NOT_TAKEN cadence, can be predicted using one or more conditional branch predictors 855.

By way of still another example, the conditional branch predictor 375 can include a dynamic conditional limit speculation state 860 in which dynamic branches that cannot be predicted accurately (i.e., low confidence) with the dynamic conditional branch predictor are predicted NOT_TAKEN until confidence improves to the point where they can be accurately predicted (i.e., high confidence).

The sequence of branch outcomes can be examined post commit and can be used to classify the branches into the above classes. A state diagram showing one implementation of the state transitions from one predictor classification to another is provided below.

Figure 9:
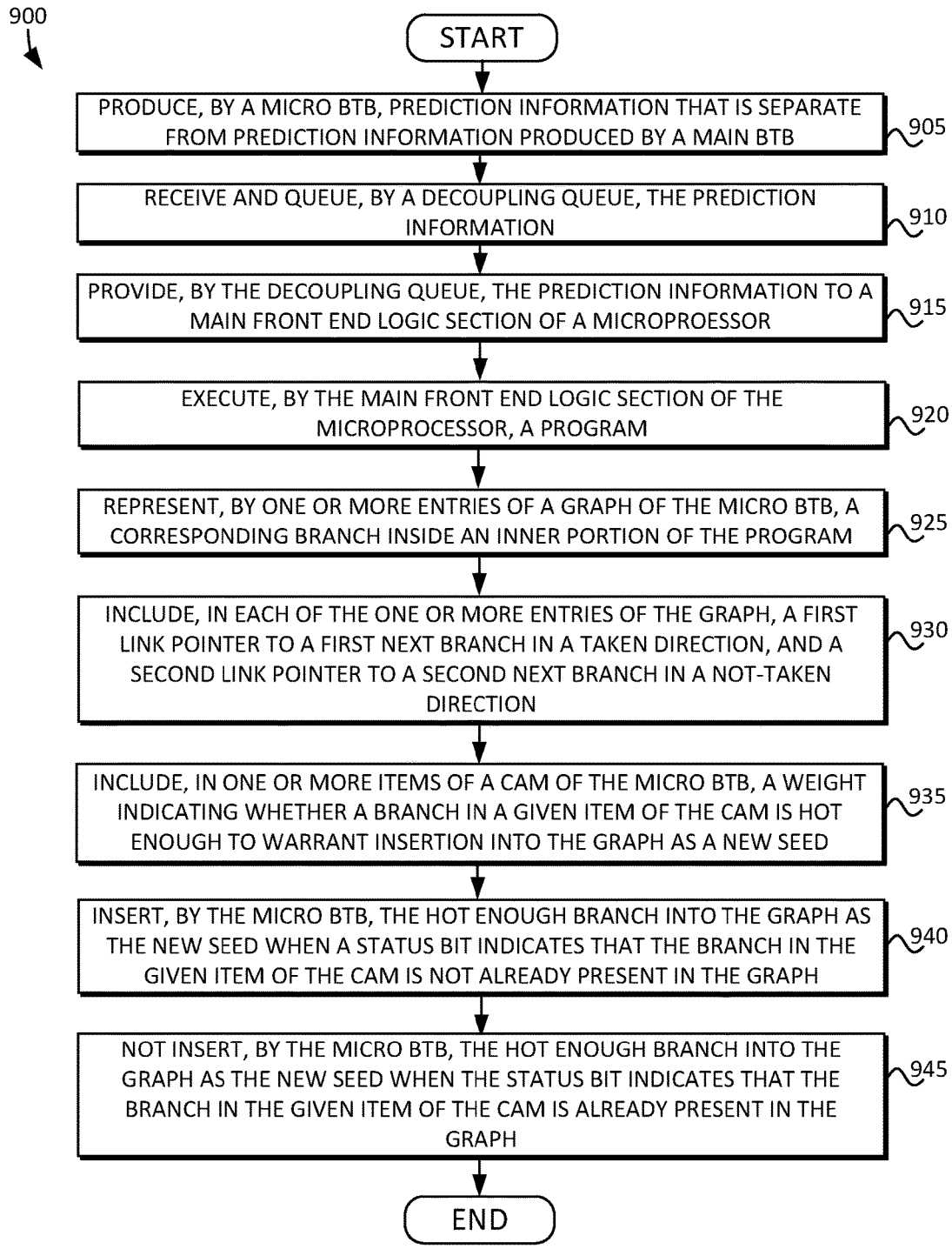
FIG. 9 is a flow diagram illustrating a technique for performing zero bubble conditional branch prediction for a main front end logic section of a microprocessor using a micro BTB in accordance with some embodiments.

FIG. 9 is a flow diagram 900 illustrating a technique for performing zero bubble conditional branch prediction for a main front end logic section of a microprocessor using a micro BTB in accordance with some embodiments. The technique can begin at 905, where a micro BTB can produce prediction information that is separate from prediction information produced by a main BTB of the main front end logic section of a microprocessor. At 910, a decoupling queue can receive and queue the prediction information. At 915, the decoupling queue can provide the prediction information to the main front end logic section of the microprocessor. At 920, the main front end logic section of the microprocessor can fetch a program. At 925, one or more entries of a graph of the micro BTB can represent a corresponding branch inside an inner portion of the program. At 930, each of the one or more entries of the graph of the micro BTB can include a first link pointer to a first next branch in a taken direction, and a second link pointer to a second next branch in a not-taken direction.

At 935, one or more items of a CAM of the micro BTB can include a weight indicating whether a branch in a given entry of the CAM is hot enough to warrant insertion into the graph as a new seed. At 940, the micro BTB can insert the hot enough branch into the graph as the new seed when a status bit indicates that the branch in the given entry of the CAM is not already present in the graph. At 945, the micro BTB can intentionally not insert the hot enough branch into the graph as the new seed when the status bit indicates that the branch in the given entry of the CAM is already present in the graph.

It will be understood that the steps as illustrated in FIG. 9 need not occur in the order illustrated, but rather, can occur in a different order and/or with intervening steps.

Figure 10:
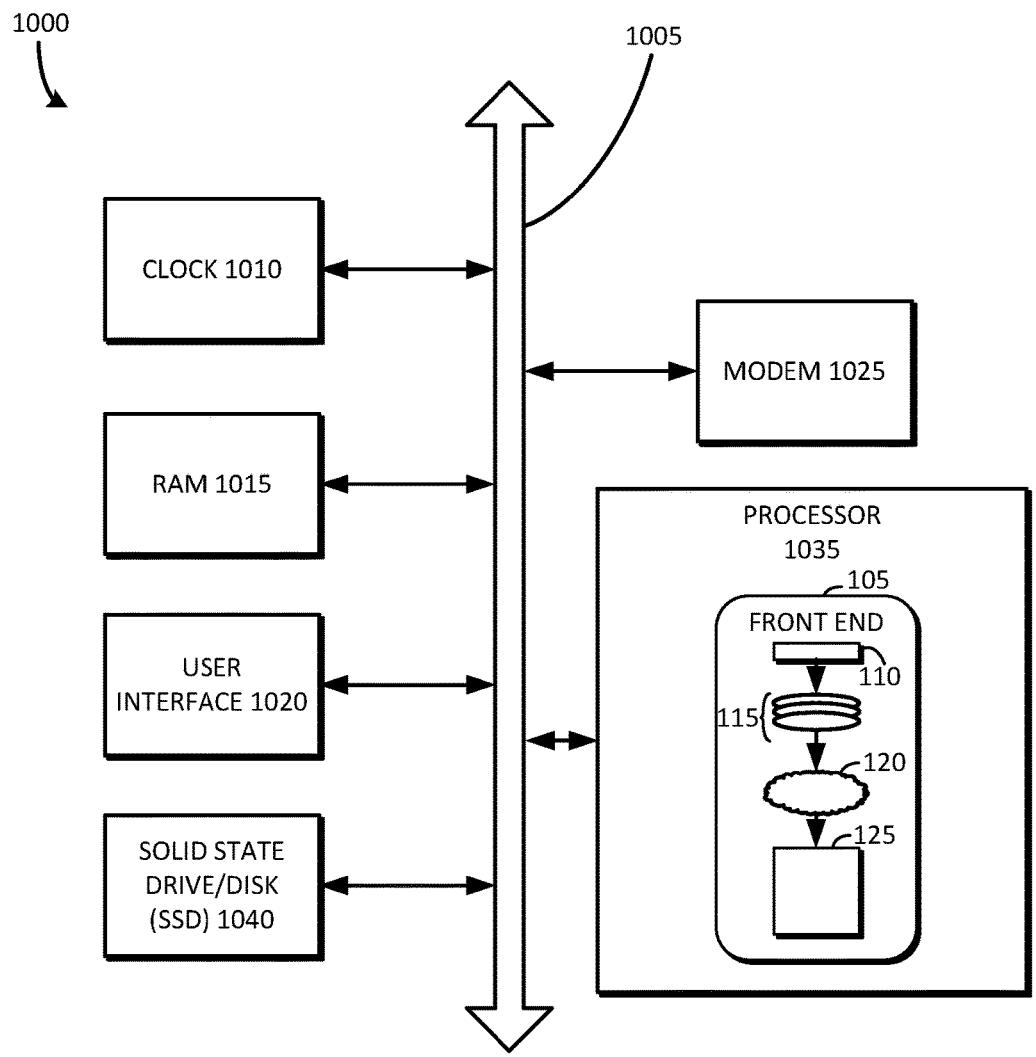
FIG. 10 is a block diagram of a computing system including the front end of the microprocessor of FIG. 1.

FIG. 10 is a block diagram of a computing system 1000 including the microprocessor 100 of FIG. 1 having the front end 105. The computing system 1000 can include a clock 1010, a random access memory (RAM) 1015, a user interface 1020, a modem 1025 such as a baseband chipset, a solid state drive/disk (SSD) 1040, and/or a processor 1035, any or all of which may be electrically coupled to a system bus 1005. The processor 1035 of the computing system 1000 can include front end 105 of FIG. 1, which may also be electrically coupled to the system bus 1005. The front end 105 can include or otherwise interface with the clock 1010, the random access memory (RAM) 1015, the user interface 1020, the modem 1025, the solid state drive/disk (SSD) 1040, and/or the processor 1035.

In an alternative embodiment, the micro BTB need not include a conditional predictor. Such an implementation can be quite small in order to make zero bubble predictions, and the size can cause it to miss some opportunities to make predictions. It can only rarely power gate off the main prediction structures. In this alternative embodiment, the micro BTB would include only highly biased taken and always-taken branches.

In yet another alternative embodiment, a loop buffer can be used. A loop buffer can capture inner loops of a program. Some embodiments can include conditional predictors that can predict loop exit. A drawback of the loop buffer is that it must contain all of the instructions in the hot inner portion of the program. The micro BTB, on the other hand, only requires that the branch instructions fit within the micro BTB graph. The actual number of instructions in the hot inner portion of the program is irrelevant. This means that the micro BTB can capture quite large loops, as well as very complex program graphs with branches that would not be accurately predicted by a loop buffer.

Some embodiments include a front end of a microprocessor having a main front end logic section, which includes a main branch target buffer (BTB). The front end can include a micro BTB separate from the main BTB of the main front end logic section, and configured to produce prediction information. The front end can include a decoupling queue coupled to the micro BTB and to the main front end logic section, and configured to receive and queue the prediction information, and to provide the queued prediction information to the main front end logic section. The micro BTB can include a graph including one or more entries, and a content addressable memory (CAM) including one or more items. The main front end logic section is configured to fetch a program. Each of the one or more entries of the graph of the micro BTB represents a corresponding branch inside an inner portion of the program. Each of the one or more entries of the graph of the micro BTB can include a first link pointer to a first next branch in a taken direction, and a second link pointer to a second next branch in a not-taken direction.

In some embodiments, each of the one or more entries of the graph of the micro BTB includes a first valid bit associated with the first link pointer to the first next branch in the taken direction, and a second valid bit associated with the second link pointer to the second next branch in the not-taken direction. In some embodiments, the graph of the micro BTB is configured to set the first valid bit when the first link pointer is valid, and to set the second valid bit when the second link pointer is valid.

In some embodiments, each of the one or more entries of the graph of the micro BTB includes a next prediction bit configured to indicate whether to follow the first link pointer to the first next branch to be predicted, or the second link pointer to the second next branch to be predicted. In some embodiments, each of the one or more entries of the graph of the micro BTB includes a pair bit configured to indicate that two branches should be predicted in parallel.

In some embodiments, each of the one or more items of the CAM of the micro BTB includes a weight that is configured to indicate whether a branch in a given entry of the CAM is hot enough to warrant insertion into the graph of the micro BTB as a new seed. In some embodiments, each of the one or more items of the CAM of the micro BTB includes a status bit that is configured to indicate whether the branch in the given entry of the CAM is already present or not in the graph of the micro BTB. In some embodiments, the micro BTB is configured to insert the hot enough branch into the graph as the new seed when the status bit indicates that the branch in the given entry of the CAM is not already present in the graph.

In some embodiments, the micro BTB is configured to not insert the hot enough branch into the graph as the new seed when the status bit indicates that the branch in the given entry of the CAM is already present in the graph. In some embodiments, each of the one or more items of the CAM of the micro BTB includes a valid bit that is configured to indicate whether a given entry of the CAM has been allocated into the graph of the micro BTB. In some embodiments, the main front end logic section includes a main predictor.

In some embodiments, the conditional branch predictor of the micro BTB comprises a static prediction state in which branches that have always resolved as taken are in an always taken state and are predicted as taken until either the main predictor or an execution unit redirect a prediction of the micro BTB to a not taken state.

In some embodiments, the conditional branch predictor of the micro BTB comprises a highly biased conditional branch prediction state in which branches that exhibit dynamic behavior, but exhibit long runs of taken or not-taken branches, are classified as either mostly taken or mostly not taken branches.

In some embodiments, the conditional branch predictor of the micro BTB comprises a loop conditional branch prediction state in which branches that exhibit dynamic behavior, but have a repeating sequence of taken outcomes having a number that is less than or equal to a threshold followed by a single not taken outcome, are classified as loops and are predicted by a loop predictor.

In some embodiments, the conditional branch predictor of the micro BTB comprises an anti-loop conditional branch prediction state in which branches that exhibit dynamic behavior, but have a repeating sequence of not taken outcomes having a number that is less than or equal to a threshold followed by a single taken outcome, are classified as anti-loops and are predicted by an anti-loop predictor.

The following discussion is intended to provide a brief, general description of a suitable machine or machines in which certain aspects can be implemented. Typically, the machine or machines include a system bus to which is attached processors, memory, e.g., random access memory (RAM), read-only memory (ROM), or other state preserving medium, storage devices, a video interface, and input/output interface ports. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth®, optical, infrared, cable, laser, etc.

Embodiments can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the various principles with reference to illustrated embodiments, it will be recognized that the illustrated embodiments can be modified in arrangement and detail without departing from such principles, and can be combined in any desired manner. And although the foregoing discussion has focused on particular embodiments, other configurations are contemplated. In particular, even though expressions such as "according to an embodiment of" or the like are used herein, these phrases are meant to generally reference embodiment possibilities, and are not intended to limit to particular embodiment configurations. As used herein, these terms can reference the same or different embodiments that are combinable into other embodiments.

Some embodiments may include a non-transitory machine-readable medium comprising instructions executable by one or more processors, the instructions comprising instructions to perform the elements as described herein.

The foregoing illustrative embodiments are not to be construed as limiting. Although a few embodiments have been described, those skilled in the art will readily appreciate that many modifications are possible to those embodiments without materially departing from the novel teachings and advantages of the present disclosure. Accordingly, all such modifications are intended to be included within the scope of the various embodiments as defined in the claims.

What is claimed is:

1. A front end of a microprocessor, comprising:
a main front end logic section including a main branch target buffer (BTB);
a micro BTB separate from the main BTB of the main front end logic section, and configured to produce prediction information; and
a decoupling queue coupled to the micro BTB and to the main front end logic section, and configured to receive and queue the prediction information, and to provide the queued prediction information to the main front end logic section,
wherein the micro BTB comprises:
a graph including one or more entries; and
a content addressable memory (CAM) including one or more items;
wherein each of the one or more items of the CAM of the micro BTB includes a weight that is configured to indicate whether a branch in a given item of the CAM is to be inserted into the graph of the micro BTB as a new seed.

2. The front end of the microprocessor of claim 1, wherein:
the main front end logic section is configured to fetch a program; and
each of the one or more entries of the graph of the micro BTB represents a corresponding branch inside an inner portion of the program.

3. The front end of the microprocessor of claim 2, wherein:
each of the one or more entries of the graph of the micro BTB includes a first link pointer to a first next branch in a taken direction, and a second link pointer to a second next branch in a not-taken direction.

4. The front end of the microprocessor of claim 3, wherein:
- each of the one or more entries of the graph of the micro BTB includes a first valid bit associated with the first link pointer to the first next branch in the taken direction, and a second valid bit associated with the second link pointer to the second next branch in the not-taken direction; and
- the graph of the micro BTB is configured to set the first valid bit when the first link pointer is valid, and to set the second valid bit when the second link pointer is valid.

5. The front end of the microprocessor of claim 4, wherein:
- each of the one or more entries of the graph of the micro BTB includes a next prediction bit configured to indicate whether to follow the first link pointer to the first next branch to be predicted, or the second link pointer to the second next branch to be predicted.

6. The front end of the microprocessor of claim 2, wherein:
- each of the one or more entries of the graph of the micro BTB includes a pair bit configured to indicate that two branches should be predicted in parallel.

7. The front end of the microprocessor of claim 1, wherein:
- each of the one or more items of the CAM of the micro BTB includes a status bit that is configured to indicate whether the branch in the given item of the CAM is already present or not in the graph of the micro BTB.

8. The front end of the microprocessor of claim 7, wherein:
- the micro BTB is configured to insert the branch in the given item of the CAM into the graph as the new seed when the status bit indicates that the branch in the given item of the CAM is not already present in the graph; and
- the micro BTB is configured to not insert the branch in the given item of the CAM into the graph as the new seed when the status bit indicates that the branch in the given item of the CAM is already present in the graph.

9. The front end of the microprocessor of claim 1, wherein:
- each of the one or more items of the CAM of the micro BTB includes a valid bit that is configured to indicate whether a given item of the CAM has been allocated into the graph of the micro BTB.

10. The front end of the microprocessor of claim 1, wherein:
- the main front end logic section includes a main predictor; and
- the micro BTB comprises a conditional branch predictor.

11. The front end of the microprocessor of claim 10, wherein the conditional branch predictor of the micro BTB comprises:
- a static prediction state in which branches that have always resolved as taken are in an always taken state and are predicted as taken until either the main predictor or an execution unit redirect a prediction of the micro BTB to a not taken state.

12. The front end of the microprocessor of claim 10, wherein the conditional branch predictor of the micro BTB comprises:
- a highly biased conditional branch prediction state in which branches that exhibit dynamic behavior, but exhibit long runs of taken or not-taken branches, are classified as either mostly taken or mostly not taken branches.

13. The front end of the microprocessor of claim 10, wherein the conditional branch predictor of the micro BTB comprises:
- a loop conditional branch prediction state in which branches that exhibit dynamic behavior, but have a repeating sequence of taken outcomes having a number that is less than or equal to a threshold followed by a single not taken outcome, are classified as loops and are predicted by a loop predictor.

14. The front end of the microprocessor of claim 10, wherein the conditional branch predictor of the micro BTB comprises:
- an anti-loop conditional branch prediction state in which branches that exhibit dynamic behavior, but have a repeating sequence of not taken outcomes having a number that is less than or equal to a threshold followed by a single taken outcome, are classified as anti-loops and are predicted by an anti-loop predictor.

15. A computer-implemented method for performing zero bubble conditional branch prediction for a main front end logic section of a microprocessor using a micro branch target buffer (BTB), the method comprising:
- producing, by the micro BTB, prediction information that is separate from prediction information produced by a main BTB of the main front end logic section of the microprocessor;
- receiving, by a decoupling queue, the prediction information from the micro BTB;
- queuing, by the decoupling queue, the prediction information from the micro BTB; and
- providing, by the decoupling queue, the queued prediction information to the main front end logic section of the microprocessor;
- wherein the micro BTB includes a graph and a content addressable memory (CAM), the method further comprising:
- fetching, by the main front end logic section of the microprocessor, a program;
- representing, by one or more entries of the graph of the micro BTB, a corresponding branch inside an inner portion of the program;
- including, in each of the one or more entries of the graph of the micro BTB, a first link pointer to a first next branch in a taken direction, and a second link pointer to a second next branch in a not-taken direction; and
- including, in one or more items of the CAM of the micro BTB, a weight indicating whether a branch in a given entry of the CAM is to be inserted into the graph of the micro BTB as a new seed.

16. The computer-implemented method of claim 15, further comprising:
- inserting, by the micro BTB, the branch in the given entry of the CAM into the graph as the new seed when a status bit indicates that the branch in the given entry of the CAM is not already present in the graph; and
- not inserting, by the micro BTB, the branch in the given entry of the CAM into the graph as the new seed when the status bit indicates that the branch in the given entry of the CAM is already present in the graph.

17. A front end of a microprocessor, comprising:
- a main front end logic section including a main branch target buffer (BTB);
- a micro BTB separate from the main BTB of the main front end logic section, configured to produce prediction information, and comprising a graph in which each graph node represents a branch, with edges that connect to other nodes along taken and not-taken directions;

a decoupling queue (DQ) coupled to the micro BTB and to the main front end logic section, and configured to receive and queue the prediction information, and to provide the queued prediction information to the main front end logic section; and wherein the micro BTB comprises:

a graph including one or more entries; and a content addressable memory (CAM) including one or more items;

wherein each of the one or more items of the CAM of the micro BTB includes a weight that is configured to indicate whether a branch in a given item of the CAM is to be inserted into the graph of the micro BTB as a new seed;

a control logic section configured to:
examine a pair of branches at the head of the DQ or received from the graph,
determine that one or both branches of the pair of branches is predicted as taken, and
in response to the determining, redirect fetch to a predicted target of the micro BTB at the beginning of a next cycle.

18. The front end of the microprocessor of claim 17, wherein the control logic section is further configured to:
compare addresses of the pair of branches with a current fetch address,
de-allocate one or both branches of the pair of branches from the DQ in response to identifying an address match during the comparing, and
update the head of the DQ.

* * * * *